Feb. 2, 1971    C. G. MIDDLETON    3,560,058
DISTRIBUTION VALVE
Filed April 25, 1969    2 Sheets-Sheet 2
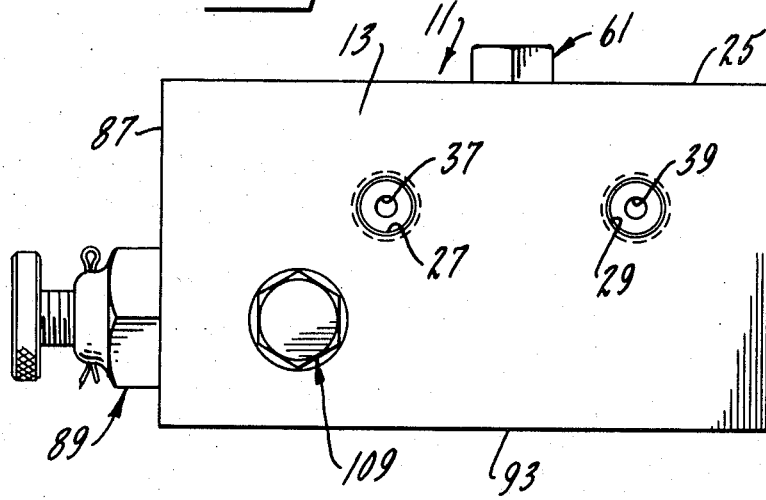
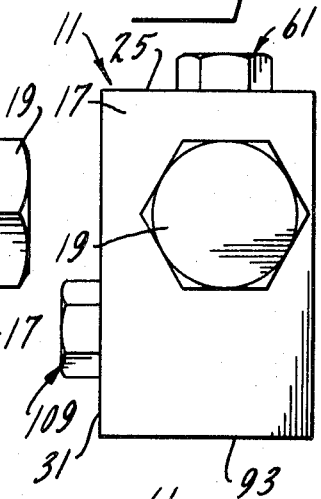
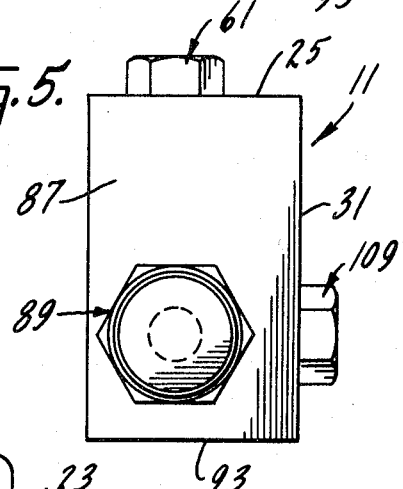
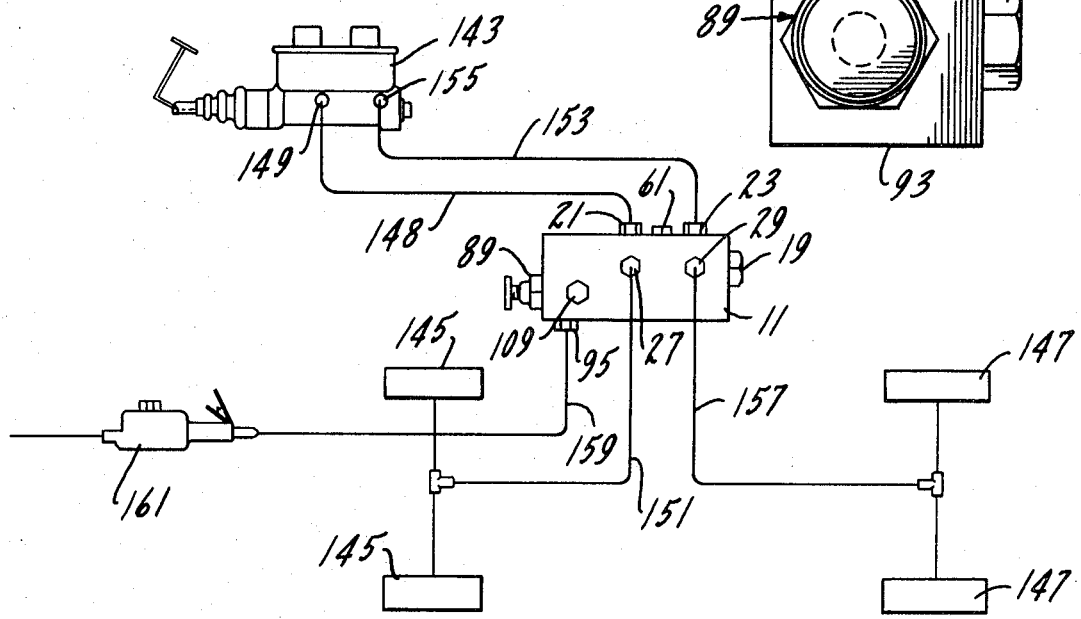
INVENTOR.
Charles G. Middleton
BY Parker, Carter & Markey
Attorneys.

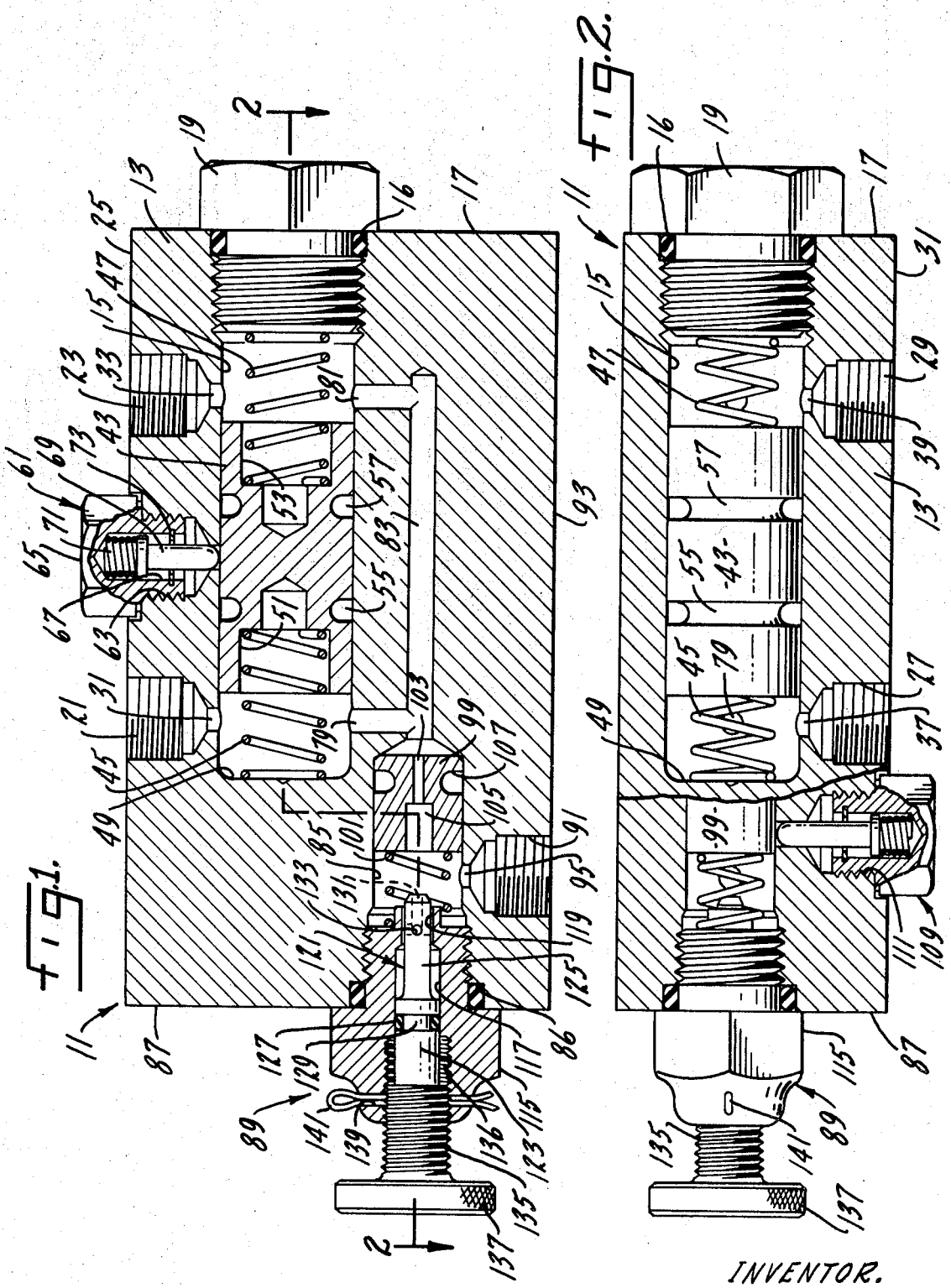

3,560,058
DISTRIBUTION VALVE

Charles Gale Middleton, Addison, Ill., assignor to Stromberg Hydraulic Brake and Coupling Company, Chicago, Ill., a corporation of Illinois
Filed Apr. 25, 1969, Ser. No. 819,246
Int. Cl. B60t 17/22, 15/00
U.S. Cl. 303—84                                    7 Claims

ABSTRACT OF THE DISCLOSURE

A distribution valve for supplying at least two outlet conduits from one or more inlet or supply conduits and arranged to shut off any one of the outlet conduits upon a pressure drop therein without adversely affecting the supply to the other outlet conduits. The valve is arranged to lock in its shut off positions. A bypass conduit which is normally supplied by all of the supply conduits is provided with its own presslure drop shut off valve and this valve has a manually controlled bleeder.

SUMMARY OF THE INVENTION

This invention is concerned with a distribution valve for supplying at least two outlets conduits from one or more inlet or supply conduits and will shut off any one of the outlet conduits upon a pressure drop therein without adversely affecting the supply to the other outlet conduits.

An object of this invention is a distribution valve which can be used to divide a single source of fluid to suply two outlets and to segregate either outlet upon a pressure drop therein.

Another object is a distribution valve for supplying a bypass fluid conduit from a pair of separate hydraulic fluid conduits while maintaining the integrity of the separate hydraulic fluid conduits in the event of a pressure loss in either one of them.

Another object is a distirbution valve which may be adapted to connect a pair of outlet conduits and a bypass conduit from one supply conduit and arranged to shut off either of the outlet conduits or the bypass conduit upon a pressure drop in any of them.

Another object is a distribution valve having a bypass outlet supplied by one or more inlet conduits and having an automatic shut off valve located in said bypass outlet passage and arranged to close upon a pressure loss in said bypass outlet passage.

Another object is a distribution valve which automatically locks in any one of its shut off positions.

Another object is a distribution valve provided with a manual bleed for the bypass conduit shut off valve.

Another object is a distribution valve of the type described in which the valve will automatically reset upon restoration of normal pressures in the conduit and upon release of the valve locking means.

Another object is a distribution valve which can be connected to the supply conduit leading from the outlet of a single master brake cylinder to supply hydraulic fluid separately to sets of brake cylinders of wheels of a vehicle.

Another object is a distribution valve which can be connected to the single outlet of a master brake cylinder to supply hydraulic fluid separately to the sets of brake cylinders of a vehicle and to supply hydraulic fluid to a braking device on an associate vehicle such as a trailer with means to segregate either set of brake cylinders or the trailer braking system upon loss of pressure in either one of the sets of brake cylinders or the trailer braking system.

Another object is a distribution valve which can be connected to the separate supply conduits leading from the outlets of a double tandem master brake cylinder to supply hydraulic fluid from both outlets to a braking device or associated vehicle such as a trailer with means to shut off either conduit or trailer braking system upon a loss of pressure in one of the conduits or in the trailer brakng system.

Other objects will be found in the following specification, claims and drawings.

BRIEF DESCRIPTION OF THE DRAWINGS

The invention is illustrated more or less diagrammatically in the following drawings wherein:

FIG. 1 is a longitudinal cross-sectional view taken through a distribution valve of this invention;

FIG. 2 is a cross-sectional view taken along line 2—2 of FIG. 1;

FIG. 3 is a side elevational view of the distribution valve on a reduced scale;

FIG. 4 is an end elevational view of the valve of FIG 3;

FIG. 5 is an elevational view of the opposite end of the valve shown in FIG. 4; and FIG. 6 is a schematic view showing the distribution valve installed in a vehicle braking system.

DESCRIPTION OF THE PREFERRED EMBODIMENT

Referring to the drawings and particularly to FIGS. 1 and 2 thereof, the distribution valve 11 of this invention includes a valve body 13 having a main cylindrical cavity 15 formed therein and extending from an opening 16 in one end wall 17 thereof. The opening into this cavity is closed by a threaded plug 19. A pair of passages 21 and 23 extend from the top wall 25 of the valve housing into the cavity 15 with the passages intersecting the cavity adjacent the opposite ends thereof. As shown in the drawings, the passages 21 and 23 may be threaded. A similar pair of passages 27 and 29 extend from the side wall 31 of the valve housing to intersect the cavity 15 at the same distances from the ends of the cavity as the passages 21 and 23. The passages 21 and 23 connect to cavity 15 through reduced inlet ports 31 and 33 and the passages 27 and 29 connect to the cavity 15 through reduced outlet ports 37 and 39.

A piston 43 is located in the cavity 15 and is held in position between the sets of ports 31, 37 and 33, 39 by springs 45 and 47 which bear respectively against the end wall 49 of the cavity and the threaded plug 19. The springs seat respectively in holes 51 and 53 formed in the ends of the piston. Circumferential grooves 55 and 57 are formed in the outside surface of the piston with the grooves being located equal distances longitudinally from the center of the piston.

A piston locking or detent assembly 61 threads into an opening 63 extending from the top wall 25 of the housing into the cavity 15. This opening is located mid-way between the inlet ports 31 and 33. The piston locking or detent assembly includes a threaded member 65 having a longitudinally extending bore 67 formed therein. Located in the bore 67 is a headed detent pin or plunger 69 which is biased to move out of the bore 67 by a spring 71. The detent pin extends through a washer 73 held in the bore with the washer adapted to engage the headed portion of the detent pin to limit movement of the pin out of the bore.

Bypass outlet ports 79 and 81 lead from the cavity 15 to a bypass outlet passage 83. It should be noted that the ports 79 and 81 are generally aligned with the ports 31, 37 and 33, 39 respectively. The bypass outlet passage 83 intersects a cavity 85 which is formed in the valve housing 13 and extends from an opening 86 in the end wall 87 of the valve housing. The opening 86 is closed by a bleeder assembly 89 which will be described in detail later. A passage 91 leads from the cavity 85 through the bottom wall 93 of the valve housing. The communication between this passage and the cavity is through a port 95.

A bypass piston 99 is located in the cavity 85 and is urged by a spring 101 towards its open position shown in FIG. 1. An axially aligned passage 103 extends through the bypass piston. The portion 105 of the passage located adjacent the end of the piston in contact with the spring is enlarged in diameter. A circumferential groove 107 is formed in the outer surface of the bypass piston adjacent one end thereof.

A bypass piston locking assembly 109 is located in an opening 111 extending from the side wall 31 of the valve housing into the cavity 85. The bypass piston locking assembly is similar in construction to the piston locking assembly 61 previously described.

The bleeder assembly 89 previously referred to includes a threaded member 115 which screw threads into the cavity 85 in the valve housing. A passageway 117 extends axially through this member with the passage being reduced in diameter at portion 119 which is located at the interior end thereof. A bleeder stem 121 is positioned in the passage 117. The bleeder stem has an enlarged piston-like portion 123 at one end thereof and a portion of reduced diameter 125 at the opposite end thereof with the piston portion engaging the walls of passage 117 and the portion of reduced diameter extending through the passage portion 119 of reduced diameter and into the cavity 85. An O-ring 127 is carried in a groove 129 formed in the piston portion of the stem.

An axial passage 131 extends part way through the bleeder stem from the reduced diameter end 125. This passage connects to four radially extending passages 133 leading to the outer surface of the stem. The piston end of the stem is attached to a screw 135 which extends into a threaded portion 136 of the passage 117. A knob 137 is formed integrally with the screw. A radial opening (not shown) extends through the screw, and when this opening is aligned with a radial opening 139 in the threaded member 115, a cotter pin 141 may be extended therethrough to lock in position the screw member 135 relative to the threaded member 115.

FIG. 6 shows the application of a distribution valve 11 of this invention in a hydraulic braking system of a vehicle. The distribution valve is interposed between the dual tandem master brake cylinder 143 and the brakes (not shown) of the sets of wheels 145 and 147 of a vehicle.

A conduit 148 leads from outlet 149 of the master brake cylinder to inlet 21 of the distribution valve. A conduit 151 leads from the corresponding outlet 27 of the distribution valve to the sets of wheels 145 of the vehicle. In a similar manner, conduit 153 connects to outlet 155 of the master brake cylinder and leads to inlet 23 of the distribution valve. Conduit 157 leads from the corresponding outlet 29 to the set of wheels 147 of the vehicle. A conduit 159 leads from the bypass outlet 95 to a brake cylinder and piston 161 which may be connected to a trailer or the like.

The use, operation and function of this invention are as follows:

The advantages of the distribution valve 11 of this invention can be best understood by a study of the operation of the valve in one of its many applications. One such application is shown in FIG. 6 where the distribution valve is inserted in the hydraulic braking system of a vehicle having a dual tandem master cylinder. In this application, the purpose of the distribution valve is to provide a supply of hydraulic fluid to the braking system of another vehicle such as a trailer. This distribution valve combines the hydraulic fluid of the dual systems of the master brake cylinder while protecting the dual systems against the failure of either master brake piston and against the pressure loss in either of the dual systems and in the trailer braking system.

The hydraulic fluid from outlets 149 and 155 of the master brake cylinder 143 are supplied through conduits 148 and 153 to the inelts 21 and 23 of the distribution valve 11. The hydraulic fluid passes from these inlets, through the ports 31 and 33 and into the cavity 15 where the hydraulic fluid acts on opposite ends of the piston 43. So long as the hydraulic pressures on opposite sides of the piston remain approximately the same, the piston will float in the center of the cavity in the location shown in FIG. 1. With the piston 43 centered in the cavity 15, the hydraulic fluid will flow through the ports 37, 39, through the outlet passages 27 and 29, into the conduits 151 and 157, and to the brake cylinders (not shown) of the sets of wheels 145 and 147.

A portion of the hydraulic fluid supplied through the conduits 148 and 153 will be delivered through the ports 79 and 81 to the bypass discharge passage 83. This fluid will flow through the axial passages 103 and 105 in the bypass piston 99, into the cavity 85, through the port 95, through the outlet passage 91 and into the conduit 159. The conduit 159 will carry the fluid to the trailer brake operating piston and cylinder 161.

A loss of hydraulic fluid pressure in either of the dual brake systems supplied by the master cylinder 143 will result in a pressure drop in the cavity 15 on the corresponding side of the piston 43. The piston will then be unbalanced and will move to close off the inlet, outlet and bypass ports of this system. For example, if hydraulic pressure is lost in the system supplying the set of wheels 145, pressure will be reduced in the cavity 15 on the left-hand side of piston 43 as viewed in FIG. 1. This reduction of pressure will cause the piston 43 to move to the left thereby shutting off inlet port 31, outlet port 37 and bypass port 79. Hydraulic fluid will continue to flow from conduit 153, through inlet port 33, through outlet port 39, through outlet passage 29 and into conduit 157. Hydraulic fluid will also continue to flow through bypass outlet port 81 to supply the trailer braking system. When the piston 43 moves completely to the left, the detent pin 69 will be aligned with and will move into the circumferential groove 57 of the plunger, locking the plunger in the ports closing position.

Upon repair of the defective brake system, the piston 43 can be restored to its normal operating condition by unscrewing the piston locking assembly 61 from the opening 63. When pressure is equalized on opposite sides of the piston, it will return to its centered position. The piston locking means 61 may then be replaced in the opening 63. The piston 43 will operate in a similar manner to shut off the inlet port 33, outlet port 39 and bypass port 81 in the event of a loss of hydraulic pressure in the conduits 153, 157.

In the event of loss of hydraulic pressure in the conduit 159 leading to the trailer braking system, the bypass piston 99 will move to the left as viewed in FIG. 1 as soon as the force of the fluid pressure acting against the right-hand side of the bypass piston overcomes the opposing force of the spring 101 and the hydraulic fluid pressure in the cavity 85. Upon seating, the bypass piston will close the outlet port 95. When the piston has seated in its shut off position, the detent pin of the locking means 109 will move into the circumferential slot 107, locking the bypass piston in the closed position. It should be noted that when the bypass piston is in its closed position, the end 125 of the bleeder stem 121 will extend slightly inside the enlarged passage opening 105 of the bypass piston. However, no hydraulic fluid will leak past the bypass piston under these circumstances since the bleeder openings 133 do not communicate with an outlet.

The bypass piston 99 can be restored to its open position after necessary repairs are made by unscrewing the bypass piston locking assembly 109 to release the bypass piston. The cotter pin 141 is then removed and the knob 137 is rotated in a clockwise direction as viewed in the drawings. Rotation of the knob 137 will move the bleeder stem 121 and the bypass piston 99 to the right as viewed in FIG. 1. As soon as the bypass piston is moved clear of the bypass port 95, hydraulic fluid will flow through passage 103 in the bypass piston, through the axial passage 131 and the radial passages 139 in the bleeder stem, through the outlet port 95 and through the outlet passage 91. As soon as pressure has returned to normal in the cavity 85, the bypass piston will move to its open position, as shown in FIG. 1. At that time, the knob 137 and bleeder stem 121 can be returned to the positions shown in FIG. 1 and the cotter pin 141 can be installed to lock this member in position. The bypass piston locking assembly 109 can be reinstalled in the opening 111.

Whereas one application of the distribution valve of this invention has been shown and described, it should be understood that the valve is not limited to this application nor is the valve limited to the exact construction shown herein. For example, the valve may be used to connect a single outlet master brake cylinder to independent braking systems for the front and rear sets of wheels of a vehicle. This may be accomplished by connecting the conduit from the master brake cylinder to inlet passages 21 and 23. Bypass outlet passage 91 and bleeder assembly opening 86 are plugged. Outlet passages 27 and 29 lead to the brake cylinders for the front and rear wheels of a vehicle. If a pressure loss occurs in either the front or rear brakes, the piston 43 will shift and shut off the flow of brake fluid to that set of brakes. Brake fluid will continue to be supplied to the other set of brakes.

Another application of the distribution valve of this invention resides in the connection of a single master brake cylinder into a dual system having a trailer braking system. This may be accomplished by adding an inlet passage to the distribution valve which leads to the bypass outlet passage 83. A conduit from the master brake cylinder connects to the new inlet passage. The inlet passages 21 and 23 are plugged. One set of wheel brakes are connected to outlet 27 and the other set is connected to outlet 29. The trailer brake system is connected to outlet 91.

Other uses of the distribution valve of this invention, both on automotive and non-automotive fields, will be apparent to one having ordinary skill in the particular art.

I claim:
1. A distribution valve including:
   a cavity,
   a spring loaded piston floating in said cavity,
   inlet port means communicating with said cavity on each side of said piston,
   outlet port means communicating with said cavity on each side of said piston,
   said piston being slidable in said cavity to selectively close the outlet port means on either side of said piston when said piston is moved by a force differential of sufficient magnitude,
   a bypass passage communicating with said cavity through separate bypass port means on each side of said piston with said piston arranged to close said bypass port means upon closing of said corresponding outlet port means,
   a bypass outlet port means communicating with said bypass passage, and
   a spring biased piston positioned in said bypass outlet port means and adpated to move into a bypass outlet port means closing position upon a pressure drop in said bypass outlet port means downstream of said piston.

2. The structure of claim 1 further characterized in that means are provided to lock said bypass outlet piston in said bypass outlet port means closing position.

3. The structure of claim 2 further characterized in that said locking means is actuated by movement of said bypass outlet piston to said bypass outlet port means closing position.

4. The structure of claim 3 further characterized in that an annular groove is formed in the outside of said bypass outlet piston and said bypass outlet piston locking means includes a spring biased detent pin adaptable to move into said annular groove upon alignment of said annular groove and said detent pin.

5. The structure of claim 1 further characterized in that a bleeder passage means extends through said bypass outlet piston.

6. The structure of claim 5 further characterized in that flow through said bleeder passage means is controlled by a hand operated screw.

7. The structure of claim 1 further characterized in that said inlet port means are connected respectively to the outlets of a tandem master brake cylinder of a vehicle, said outlet port means are connected respectively to the brakes of separate sets of wheels of a vehicle, and said bypass outlet port means is connected to a brake system pressure cylinder of a trailer vehicle.

References Cited

UNITED STATES PATENTS

| 2,195,214 | 3/1940 | Jacob | 303—84 |
| 3,018,786 | 1/1962 | Stratton | 303—84X |
| 3,079,938 | 3/1963 | McCann | 303—84X |
| 3,447,835 | 6/1969 | Parkhurst | 188—152X |

FOREIGN PATENTS

| 574,519 | 3/1958 | Italy | 303—84 |

MILTON BUCHLER, Primary Examiner

J. J. McLAUGHLIN, Jr., Assistant Examiner

U.S. Cl. X.R.

60—54.5; 137—118; 188—152; 200—82; 303—7